US007890119B2

(12) United States Patent
Jethwa et al.

(10) Patent No.: US 7,890,119 B2
(45) Date of Patent: Feb. 15, 2011

(54) DYNAMIC SELECTION OF USER PLANE OR CONTROL PLANE OR CONTROL PLANE FOR LOCATION DETERMINATION

(75) Inventors: Piyush Jethwa, Overland Park, KS (US); Simon Youngs, Overland Park, KS (US); Robert M. Lupa, Mount Vernon, IL (US)

(73) Assignee: Sprint Spectrum L.P., Overland Park, KS (US)

( * ) Notice: Subject to any disclaimer, the term of this patent is extended or adjusted under 35 U.S.C. 154(b) by 1303 days.

(21) Appl. No.: 11/438,924

(22) Filed: May 23, 2006

(65) Prior Publication Data

US 2007/0275732 A1 Nov. 29, 2007

(51) Int. Cl.
*H04Q 7/20* (2006.01)
(52) U.S. Cl. .................. 455/456.1; 455/456.2; 455/457; 455/521; 455/414.2
(58) Field of Classification Search ... 455/456.1–456.6, 455/457, 521, 414.2
See application file for complete search history.

(56) References Cited

U.S. PATENT DOCUMENTS

| | | | |
|---|---|---|---|
| 7,317,910 B2 * | 1/2008 | Niemenmaa et al. | 455/414.2 |
| 7,424,293 B2 * | 9/2008 | Zhu | 455/432.1 |
| 2004/0242238 A1 | 12/2004 | Wang et al. | |
| 2005/0043038 A1 | 2/2005 | Maanoja et al. | |
| 2005/0085239 A1 | 4/2005 | Cedervall | |
| 2005/0132295 A1 | 6/2005 | Noll et al. | |
| 2005/0153687 A1 | 7/2005 | Niemenmaa et al. | |
| 2006/0046747 A1* | 3/2006 | Abraham et al. | 455/456.6 |
| 2007/0142059 A1* | 6/2007 | Wang | 455/456.1 |

OTHER PUBLICATIONS

Qualcomm Incorporated, "Location-Based Services System Specification," 80-V6410-1NP D, Dec. 3, 2003.
Qualcomm Incorporated, "gpsOne™, User Plane MS-MPC (Nonproprietary) Protocol Specification", 80-V5456-1NP F, Oct. 18, 2004.
J. Dyoub & B. Collins, "Dueling Architectures: Control plane vs. User-plane Which is right for you?," Hewlett-Packard Development Company, L.P., 2004.
Openwave Systems, Inc., "Openwave® Location Manager Commercial Edition," Sep. 2005.
Openwave Systems Inc., "Openwave® Location Manager," Oct. 2002.
Qualcomm Incorporated,"IS-801 Call Flows for gpsOne® PDM," Release 4.x, 80-V6151-2 A, Mar. 10, 2005.

* cited by examiner

*Primary Examiner*—Charles N Appiah
*Assistant Examiner*—Michael T Vu

(57) ABSTRACT

A method and system for dynamic selection of user plane or control plane signaling for mobile station location determination. A positioning system receives a request for the location of a mobile station and then makes a determination, based on one or more factors, of whether to employ user plane signaling or control plane signaling to obtain mobile station location data. The factors may include mobile station capability, mobile station call state, mobile station support for user plane signaling, mobile station support for simultaneous voice and data communication, time, precision of requested location, subscriber preference, failure of control plane or user plane signaling, and preference specified by the request, among others. Given the determination, the positioning system then employs the selected signaling mechanism.

20 Claims, 6 Drawing Sheets

| PRESENCE DATA | |
|---|---|
| MIN | ON CALL? |
| MIN1 | YES |
| MIN2 | NO |
| MIN3 | YES |

FIG. 5A

| DEVICE CAPABILITY DATA | |
|---|---|
| MIN | SIGNALING CAPABILITY |
| MIN1 | CONTROL |
| MIN2 | CONTROL |
| MIN3 | USER |

FIG. 5B

| SUBSCRIBER PREFERENCE DATA | |
|---|---|
| MIN | SIGNALING PREFERENCE |
| MIN1 | USER |
| MIN2 | CONTROL |
| MIN3 | USER |

FIG. 5C

| FACTOR PRIORITIZATION DATA | |
|---|---|
| FACTOR | PRIORITY |
| DEVICE CAPABILITY | 1 |
| PRESENCE | 1 |
| SUB. PREFERENCE | 2 |
| TIME | 3 |

FIG. 5D

DYNAMIC SELECTION OF USER PLANE OR CONTROL PLANE OR CONTROL PLANE FOR LOCATION DETERMINATION

FIELD OF THE INVENTION

The present invention relates to telecommunications and, more particularly, to determination of the location of mobile stations such as cell phones for instance.

BACKGROUND

Cellular wireless is an increasingly popular means of personal communication in the modern world. To provide cellular wireless communication services, as shown in FIG. 1, a wireless carrier typically operates a radio access network (RAN) 12, which may include a base transceiver station (BTS) 14, a base station controller (BSC) 16, and a mobile switching center (MSC) 18. The BTS 14 radiates to define a wireless coverage area such as a cell or cell/sector in which a mobile station 20 can communicate with the BTS 14 over an air interface 22. The BTS 14 is then coupled or integrated with the BSC 16, which may control aspects of the air interface (such as channel assignments and handoff). In turn, the BSC 16 is coupled with the MSC 18, which provides connectivity with the public switched telephone network (PSTN) 24. Further, the BSC is coupled with a packet data serving node (PDSN) 26, which provides connectivity with a packet-switched network 28 (such as the Internet or a private packet network). With this arrangement, mobile station 20 can thus communicate through RAN 12 with entities on the PSTN 26 and/or the packet-switched network 28.

In usual practice, for instance, to place a call over PSTN 24, mobile station 20 may transmit a call origination message over an air interface access channel to RAN 12, providing dialed digits. Upon receipt of the call origination message, MSC 18 may then direct BSC 16 to assign an air interface traffic channel for use by mobile station to engage in the call, and MSC 18 may set up the call over PSTN 24 to the called number. In particular, MSC 18 may engage in ISDN User Part (ISUP) signaling over a signaling network 40, such as a Signaling System #7 (SS7) network, with a switch serving the called party, in an effort to set up the call over PSTN 24 to that party. Similarly, when MSC 18 receives a request to connect a call to mobile station 20, MSC 18 may page the mobile station 20 over an air interface paging channel and may direct BSC 16 to assign an air interface traffic channel for the call.

To engage in packet-data communication on network 28, mobile station 20 would typically need to acquire a radio link, a data link, and an IP address. To do so, for instance, the mobile station 20 may transmit a packet-data origination request message over an air interface access channel to RAN 12. Upon receipt of that message, MSC 18 may then forward the message back to BSC 16. BSC 16 may then assign an air interface traffic channel for use by the mobile station as a radio link. Further, BSC 16 may signal to PDSN 26, and PDSN 26 may negotiate with mobile station 20 to establish a point to point protocol (PPP) data link. Still further, PDSN 26 or a mobile-IP home agent (not shown) may assign an IP address for use by mobile station to communicate on network 28.

An important feature of contemporary cellular wireless networks is an ability to locate the geographical position of a mobile station. Such a feature was initially developed to assist emergency services in locating a mobile station. However, the availability of location information to support E911 services has given rise to the development of many other location-based services as well.

For instance, given the location of a mobile station, a location-based service provider/application 30 (e.g., a cellular wireless carrier or third party) in PSTN or packet-switched communication with mobile station 20 can provide the mobile station user with a weather or traffic report in the user's vicinity. As another example, a location-based service provider can report a list of services or establishments (e.g., restaurants, parks, theatres, etc.) in the user's vicinity. As still another example, a location-based service provider can provide a mobile station user with a map of the user's location or with directions for travel between the user's location and another location. And as yet another example, knowing that a mobile station is operating in a particular location, a location-based service provider can send the mobile station a location-based message, such as an advertisement or coupon for a nearby establishment. Other location-based services exist currently or will be developed in the future as well.

In practice, when a location-based service (LBS) application wants to determine the location of a mobile station, the application may send a location request message to the wireless carrier that serves the mobile station. In response, the carrier may then engage in a process to determine where the mobile station is currently located, and the carrier may then generate a response to the location request and send the response to the LBS application.

Typically, a wireless carrier will operate a positioning system 32 that is arranged to determine and report mobile station locations to requesting entities. The positioning system 32 may include a "mobile positioning center" (MPC) 34 and a position determining entity (PDE) 36, which may be integrated together. The position determining system 32 may function to determine the location of a given mobile station based on various factors such as (i) the identity and location of the cell/sector in which the mobile station is currently operating, (ii) satellite-based positioning information provided by the mobile station, (iii) round trip signal delay measurements, and/or (iv) signal strength measurements. Further, the carrier may operate a location server 38 that acts as a front end for receiving location requests from LBS applications and forwarding those requests to the position determining system.

When the location server 38 receives a location request from the LBS application 30, the location server may send a corresponding location request to the MPC (e.g., via network 28), and the MPC/PDE may, in turn, determine the location of the mobile station. The MPC may then return the determined location of the mobile station to the location server, and the location server may then return to the LBS application the determined location or data derived from the determined location (such as mapping, routing, or street address information, for instance).

Oftentimes to determine the location of a mobile station, a carrier's positioning system 32 will need to obtain information from the mobile station itself. This information may comprise satellite positioning data, such as GPS readings or other data, information regarding the cell/sector in which the mobile station is currently operating, and information about signals the mobile station is receiving from various base stations, for instance. To obtain data from the mobile station, the positioning system may thus need to communicate with the mobile station.

Today, two disparate mechanisms are known for providing communication between a positioning system and a mobile station: (i) "control plane" signaling and (ii) "user plane" signaling. Further, a given positioning system, in cooperation with other elements of a carrier's network, will typically be configured to use just one of these two mechanisms, but not both.

Control plane signaling is the more traditional mechanism for communicating position-related data between a positioning system and a mobile station. With control plane signaling, when positioning system 32 seeks to determine the location of mobile station 20, positioning system 32 will typically identify the MSC 18 serving the mobile station and will engage in a signaling communication session with the MSC 18, and the MSC 18 will in turn engage in a signaling communication session with the mobile station 20, to obtain the desired data and pass the data along to the positioning system 32.

More particularly, to engage in control plane signaling, the positioning system 32 may first query a home location register (HLR) 42, via the signaling network 40, to determine the point code subsystem number (PC_SSN) of the MSC 18 currently serving the mobile station. For instance, the positioning system may send an IS-41 Location Request (LOCREQ) to the HLR, or an IS-41-D SMS Request (SMSREQ) message to the HLR, providing the HLR with an identifier of the mobile station, and the HLR would respond (in a Location Request return result (locreq_rr) or SMS Request return result (smsreq_rr)) with the PC_SSN of the currently serving MSC (or a last known serving MSC). The query to the HLR could carry a mobile station identifier (such as a mobile directory number (MDN)) as indicated in the initial location request to the MPC.

Industry standard 3GPP2 X.P0002/TIA PN-4747 (IS-881), in turn, defines many of the location request messages that would pass between the MPC, PDE and MSC for control plane signaling. For instance, the MPC 34 may send to the MSC 18 an IS-881 "ISPOSREQ" message seeking cell/sector information, and the MSC 18 may respond to the MPC 34 with an IS-881 isposreq return result (isposreq_rr) message. Further, the MPC 34 may send to the PDE 36 an IS-881 "GPOSREQ" request message, and the PDE 36 may responsively send to the MSC 18 an IS-881 "SMDPP" request message. Still further, the MSC 18 may respond to the PDE 36 with an IS-881 smdpp_rr message, and the PDE 36 may respond to the MPC 34 with a gposreq_rr message.

Additionally, industry standard IS-801 defines position determination messages that can pass over an air interface between an MSC and a mobile station for purposes requesting and receiving location data. For instance, the MSC 18 can send an IS-801 position determination request (PD Request) message over the air to mobile station 20, request the mobile station to provide satellite-based positioning information, and the mobile station 20 can respond with an IS-801 position determination response (PD Response) message over the air to the MSC 18, providing the requested satellite-based positioning information.

In operation, when the MPC 34 receives a request for the location of mobile station 20, the MPC 34 may invoke the PDE 36 to determine the location. More particularly, the MPC 34 may first query HLR 42 to identify the MSC 18 serving the mobile station and may then send an ISPOSREQ to that MSC, to determine the cell/sector in which the mobile station is currently operating, so that the MPC 34 may determine (e.g., look up) the centroid of that cell/sector. The MPC 34 may then send a GPOSREQ to the PDE 36, providing the PDE 36 with (i) an identifier of the mobile station, (ii) an identifier of the serving MSC 18, and (iii) the determined cell/sector centroid.

Upon receipt of the GPOSREQ, the PDE 36 may then use the cell/sector centroid as a basis to identify (e.g., look up) what satellite(s) the mobile station can use to obtain satellite-based positioning information. The PDE 36 may then send an SMDPP message to the MSC 18, specifying one or more satellites that the mobile station should use to obtain satellite-based positioning information. In response to the SMDPP message, the MSC 34 may then send an IS-801 PD Request message over a previously-assigned air interface traffic channel to the mobile station, indicating the satellite(s) from which the mobile station should get positioning information.

In turn, the mobile station 20 would look to the designated satellite(s) to obtain the requested satellite-based positioning information and would provide the information in an IS-801 PD Response message over the air to the MSC 18. Upon receipt of that PD Response message, the MSC 18 would then generate and send an smdpp_rr to the PDE 36, providing the PDE 36 with the requested satellite-based positioning information.

In some cases, the PDE 36 may need additional satellite-based positioning information in order to sufficiently determine the location of the mobile station. Thus, in some cases, the PDE 36 may send one or more additional SMDPP-based location requests to the MSC 18, which would cause the MSC 18 to send one or more corresponding IS-801 PD Requests to the mobile station, and so forth. Once the PDE 36 has all the information it needs, it may then send an SMDPP "Release" message to the MSC 18, which would signal to the MSC 18 that the MSC 18 can release the assigned traffic channel (if the traffic channel had been assigned for purposes of the location determination process) or that the MSC 18 can stop using the traffic channel for location determination messaging (if the mobile station was already using the traffic channel).

Provided with the satellite-based positioning information from the mobile station 20 and with the cell/sector centroid from the MPC 34, the PDE 36 may then apply standard algorithms to determine a geographic location of the mobile station, and the PDE may return that location in a gposreq_rr to the MPC 34. The MPC 34 may then report that location in a response to the location request that it received.

User plane signaling has been developed more recently to provide a more streamlined form of communication between positioning system 32 and mobile station 20. With user plane signaling, positioning system 32 and mobile station 20 engage in more direct communication session with each other, through 2-way Short Messaging Service (SMS) signaling (e.g., via an SMS Controller 44) and/or through IP communication (via network 28), so that mobile station 20 can pass any desired location data directly to the positioning system.

In an exemplary user plane signaling process, for instance, MPC 34 may send a specially coded GPOSREQ to PDE 36 seeking a read on the mobile station's location and thus putting the PDE 36 on notice that the PDE 36 is about to engage in user plane signaling with the mobile station 20 to receive data necessary for determining the mobile station's location. Further, the MPC 34 may send to the mobile station a specially coded SMS message that will trigger the mobile station 20 to engage in further user plane signaling with the positioning system 32.

The SMS message from MPC 34 to mobile station 20 may, for instance, cause client logic in the mobile station 20 to respond directly to the MPC 34 with a mobile originated SMS message that provides the MPC 34 with certain data, such as the cell/sector in which the mobile station 20 is currently operating. As such, this 2-way SMS messaging between the MPC 34 and the mobile station 20 may take the place of the control plane process of MPC 34 sending an ISPOSREQ to the serving MSC 18 to determine the cell/sector. The MPC 34 may then pass the determined cell/sector information along to the PDE 36.

Furthermore, the SMS message from MPC 34 to mobile station 20 may specify a network address of PDE 36 and may cause the client logic in the mobile station to initiate IP-based communication with that network address, much as a WAP Push message conventionally triggers a mobile station to engage in IP communication with a designated address. Once the mobile station 20 initiates that IP-based communication with the PDE 36 (e.g., establishes a TCP/IP session with the PDE 36), the PDE 36 and mobile station 20 may then engage in an IS-801 position determination session over IP.

Thus, rather than sending an SMDPP message to the serving MSC 18 as in control plane signaling, the PDE 36 in user plane signaling may send an IS-801 PD Request message over IP (via network 28) to the mobile station. And the mobile station may then send an IS-801 PD Response message over IP (via network 28) to the PDE 36, thus providing the PDE with the information that it needs to compute the mobile station's location. For instance, through the IS-801 over IP session, the mobile station may report its serving cell/sector to the PDE 36 (e.g., as an alternative to reporting it in a mobile originated SMS to the MPC 34). Further, through the IS-801 over IP session, the PDE 36 may request the mobile station 20 to get positioning information from one or more particular satellite(s), and the mobile station 20 may obtain that information and report it in response to the PDE 36.

FIG. 2 depicts in summary the different communication paths through which exemplary control plane and user plane signaling would pass between positioning system 32 and mobile station 20. As shown in FIG. 2, if the positioning system 32 is arranged to engage in control plane signaling, the positioning system 32 may engage in an IS-881 communication session 50 with MSC 18, and the MSC 18 may in turn engage in an IS-801 communication session 52 with mobile station 20. On the other hand, if the positioning system 32 is arranged to engage in user plane signaling, the positioning system 32 may engage in an IS-801 over IP communication session with the mobile station 20.

SUMMARY

As noted above, existing positioning systems are configured to employ either control plane signaling or user plane signaling, but not both. Indeed, as both forms of signaling achieve largely the same result, it would be redundant to employ both control plane and user plane signaling. Legacy carrier systems typically employ control plane signaling. However, upgraded carrier systems may instead be arranged to employ user plane signaling.

The present invention stems from a realization, however, that there may be certain instances in which the choice of signaling type may in fact matter. Thus, it would be useful in certain instances to employ user plane signaling, whereas it might be useful in other instances to employ control plane signaling.

The present invention is accordingly directed to a method and system for dynamically selecting between at least two such signaling mechanisms on a case by case basis. With the benefit of the invention, a carrier's positioning system may programmatically opt to employ control plane signaling when faced with certain location queries but to employ user plane signaling when faced with other location queries.

BRIEF DESCRIPTION OF THE DRAWINGS

FIG. 5 depicts simplified examples of the data sources shown in FIG. 4.

DETAILED DESCRIPTION

Figure 3:
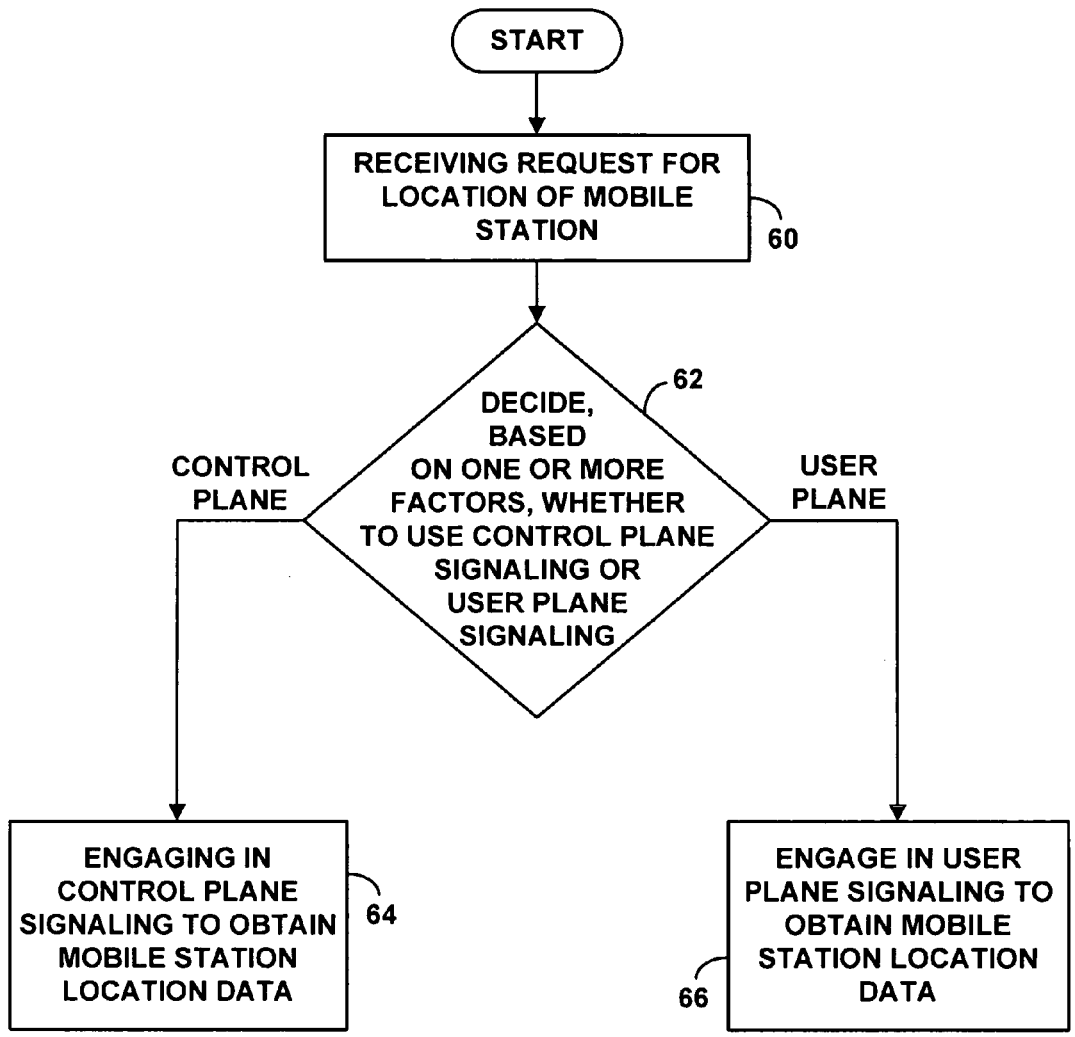
FIG. 3 is a flow chart depicting functions carried out in accordance with an exemplary embodiment.

In one respect, an exemplary embodiment of the invention may take the form of a method carried out by a positioning system or associated network entity. This method is illustrated generally by the flow chart of FIG. 3. As shown, the method may involve at step 60 receiving a request for location of a mobile station. In response to the request, the method my then involve at step 62 making a determination, based one or more factors, of whether to obtain mobile station location data through control plane signaling or user plane signaling. If the determination is to obtain the mobile station location data through control plane signaling, then the method may next involve at step 64 engaging in control plane signaling to obtain the mobile station location data. Alternatively, if the determination is to obtain the mobile station location data through user plane signaling, then the method may next involve at step 66 engaging in user plane signaling to obtain the mobile station location data. Further, this process may be repeated in practice (for the same mobile station or different mobile stations), so that, in a one instance, control plane signaling is employed, whereas in another instance, user plane signaling is employed.

In this method, the one or more factors taken into account to determine whether to employ control plane signaling or user plane signaling may take various forms. As one example, not all mobile stations may be user plane capable (e.g., programmed with logic to engage in user plane signaling). Thus, the method may comprise referring to device-capabilities data (e.g., a CC/PP data store) to determine whether the particular mobile station at issue is user plane capable. If the mobile station is user plane capable, then the determination may be to employ user plane signaling, whereas, if the mobile station is not user plane capable, then the determination may be to employ the more traditional control plane signaling.

As another example, many mobile stations are incapable of engaging in simultaneous voice and data communications. If such a mobile station is currently engaged in a phone call, it may thus be impossible for the mobile station to engage in user plane signaling, since the mobile station would be unable to engage in IP-based communications with the PDE at the same time as the mobile station engages in the phone call. Thus, the method may comprise referring to state-data (i.e., presence data) to determine whether the mobile station at issue is currently engaged in a call. If the mobile station is currently engaged in a call (and possibly if device capabilities data indicates that the mobile station is incapable of engaging in simultaneous voice and data communication), then the determination may be to employ control plane signaling. On the other hand, if the mobile station is not currently engaged in a call (or if device capabilities data indicates that the mobile station is capable of engaging in simultaneous voice and data communication), then the determination may be to employ user plane signaling.

As still another example, if the location request received by the positioning system seeks merely low-precision location information such as cell/sector information, then it may be sufficient to employ a portion of traditional control plane signaling—simply having the MPC send an ISPOSREQ to the serving MSC to determine the mobile station's cell/sector. In that case, the determination may be to employ legacy control plane signaling. On the other hand, if the location request received by the positioning system seeks high precision location information, then it may be preferable to employ user plane signaling to directly obtain the necessary data from the mobile station. In that case, the determination may be to employ user plane signaling.

And as yet another example, for one reason or another, the LBS application seeking location information from the positioning system may itself have a preference between control plane signaling and user plane signaling and may express that preference by a designated code in its request to the positioning system. (Alternatively, an intermediary sitting in the communication path between the LBS application and the positioning system may be programmed to express such a preference and may alter a position request to the positioning system to include a code expressing that preference). In that case, if the request to the positioning system specifies use of control plane signaling (or otherwise directly or indirectly indicates such a preference), then the determination may be to use control plane signaling. On the other hand, if the request to the positioning system specifies use of user plane signaling, then the determination may be to use user plane signaling.

Still further, the determination of whether to use control plane signaling or user plane signaling can be based on failure of one or the other signaling mechanisms. For example, the positioning system may first attempt to engage in user plane signaling with the mobile station, such as with the MPC sending an SMS trigger message to the mobile station, in response to which the MPC would expect to receive a mobile-originated message from the mobile station. The MPC may set a lifetime timer for the SMS message it sends to the mobile station. If the MPC does not then receive a response mobile originated SMS message from the mobile station within that lifetime, the MPC may then responsively use control plane signaling. As another example, the positioning system may first attempt to engage in control plane signaling, but the control plane signaling may fail because the mobile has begun roaming such that the MPC is unable to contact the currently serving MSC. In that scenario, if the mobile station still has data coverage or is otherwise able to engage in user plane signaling, the MPC may then instead employ user plane signaling with the mobile station.

Yet further, as another example, the positioning system or associated entity may be programmed to select between control plane and user plane signaling based on one or more other various factors, such as time (time of day, day of week, date, etc.), subscriber preference, subscriber service level, LBS application service level, switch capability, network congestion and/or other network metrics or other factors now known or later contemplated.

In the exemplary method, multiple factors, such as those described above or others, may be taken into account. Further, multiple factors may be prioritized or weighed for consideration by the positioning system. Thus, if one factor has relatively low priority and results in a determination that user plane signaling should be used, while another factor has relatively high priority and results in a determination that control plane signaling should be used, then the ultimate determination based on these two factors might be to use control plane signaling. Further, multiple factors may have equal priorities, such that, if any of the factors results in a determination that control plane signaling should be used, then any conflict may be resolved in favor of control plane signaling. Other rules for combining together various factors could be applied as well.

In the exemplary method, control plane signaling would preferably comprise a first communication session between the positioning system and a switch serving the mobile station and a second communication session between the switch and the mobile station. In practice, as is well known in the art for control plane signaling, the first communication session may be an IS-881 communication session and the second communication session may be an IS-801 communication session.

Further, in the exemplary method, user plane signaling may comprise a communication session between the positioning system and the mobile station. For instance, the communication session between the positioning system and the mobile station may comprise an IS-801 over IP session and/or an SMS session (e.g., 2-way SMS communication). In the exemplary embodiment, the user plane signaling may be network initiated, such as by the positioning system sending an SMS message to the mobile station that triggers the mobile station to engage in further user plane communication with the positioning system.

Figure 1:
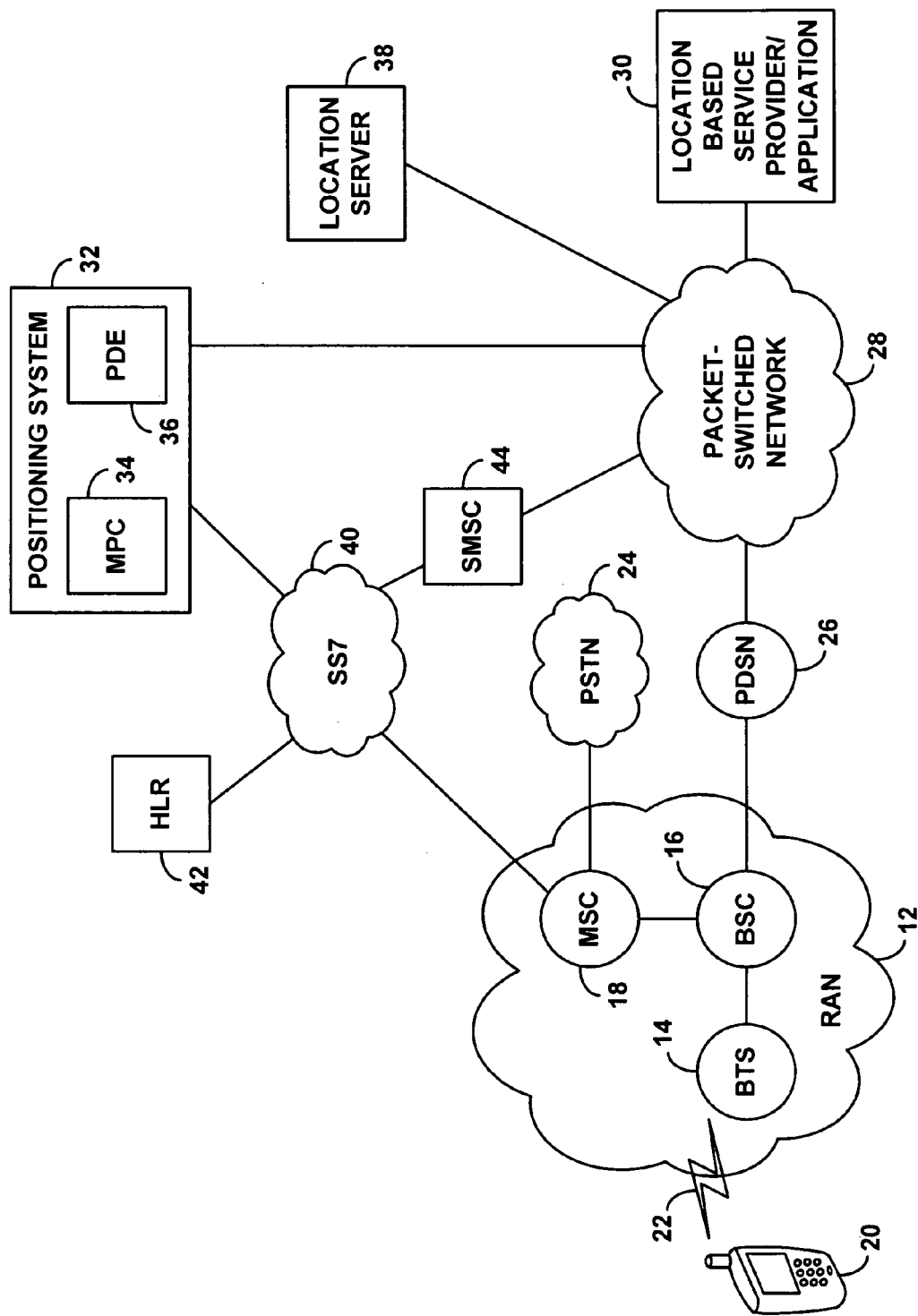
FIG. 1 is a simplified block diagram of a telecommunications network in which the exemplary embodiment can be implemented.
Figure 2:
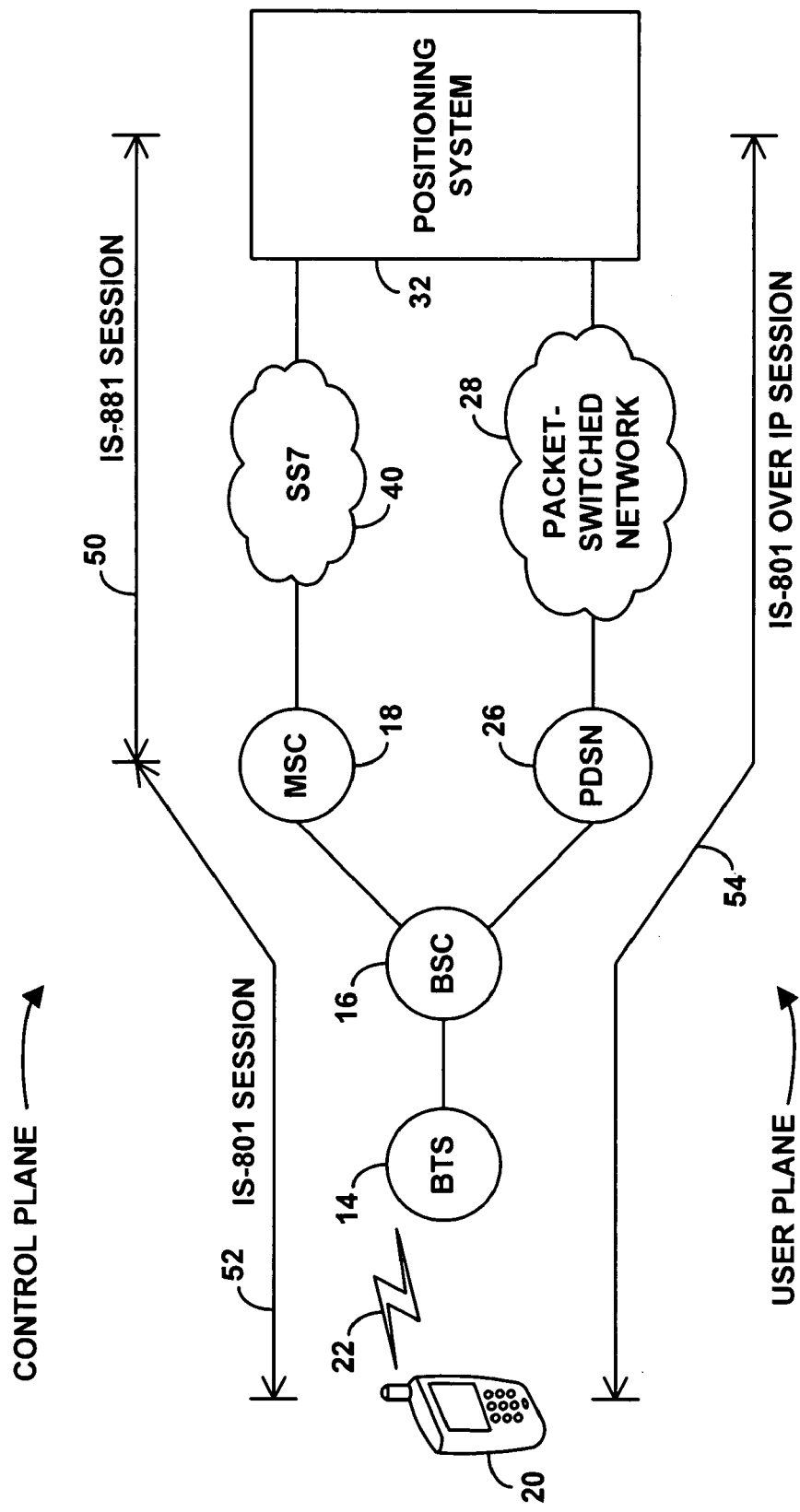
FIG. 2 is a simplified block diagram summarizing exemplary control plane signaling and user plane signaling.
Figure 4:
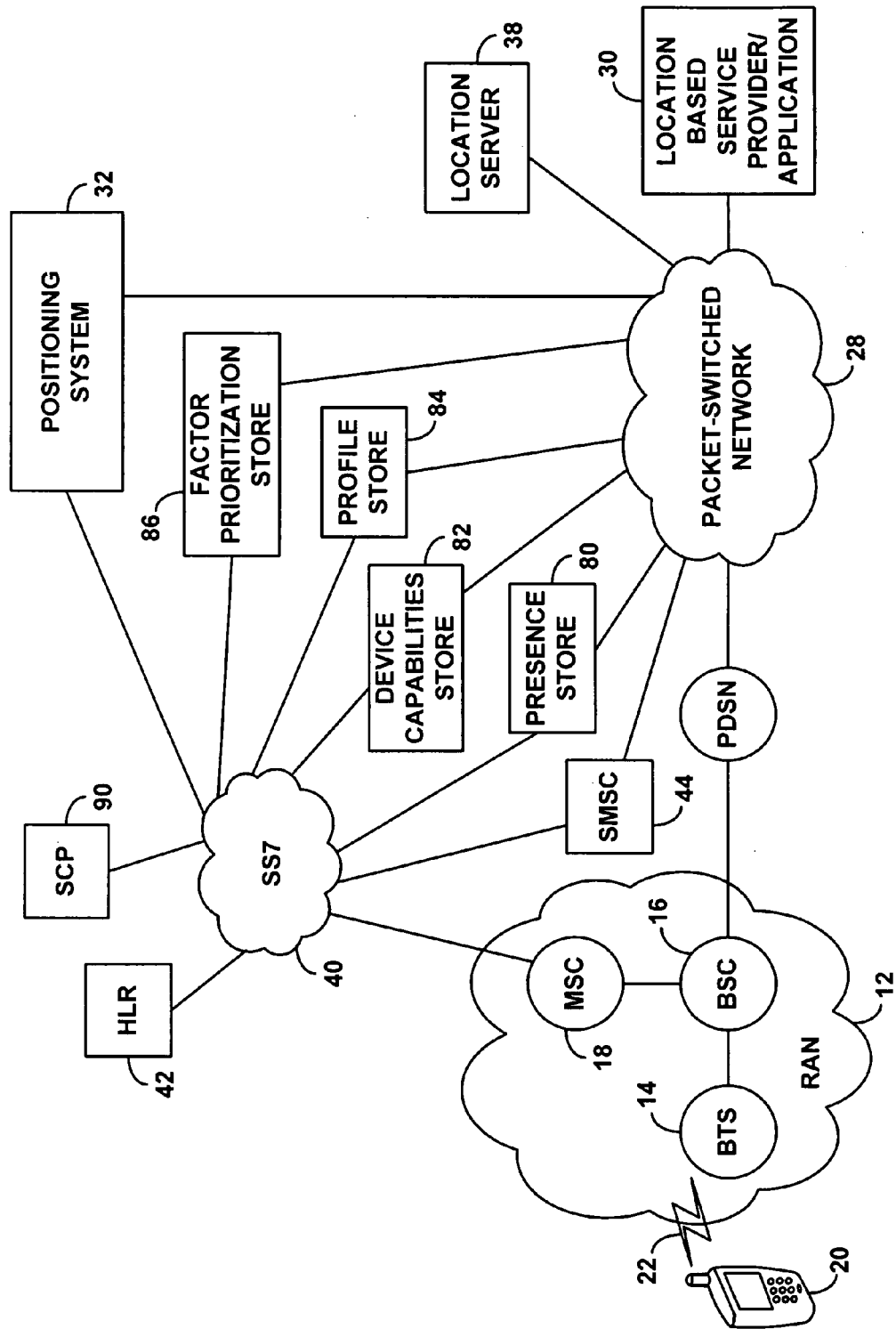
FIG. 4 is a variation of the arrangement of FIG. 1, depicting exemplary data sources accessible by a positioning system to implement embodiments of the invention.

FIG. 4 next depicts a variation of FIG. 1, showing some examples of data sources that positioning system 32 may reference as a basis to decide whether to employ control plane signaling or user plane signaling on a case by case basis. In particular, FIG. 4 depicts by way of example, a presence store 80, a device capabilities store 82, a subscriber profile store 84, and a factor-prioritization store 86. Each of these data stores is shown sitting as a node on packet-switched network 28 and may thus be easily accessible by positioning system 32 through any defined IP-based signaling, such as HTTP or FTP signaling for instance. Further, the data stores are also shown sitting as nodes on SS7 network 40, to illustrate that the data stores may be accessible for one reason or another via the SS7 network. FIG. 5 (in its subparts) depicts simplified examples of data that can be maintained in these data stores.

FIG. 5A depicts example presence data that may be maintained in presence store 80. As shown, the example presence data lists for each of a plurality of mobile stations (identified by Mobile Identification Number (MIN) for instance) whether the mobile station is currently engaged in a PSTN call (e.g., a voice call) or not. Such presence data can be established and maintained through real-time updates provided by an intelligent network control point such as a service control point (SCP) 90 or HLR 42 for instance, using prepaid call state messaging for instance. In particular, through programmed intelligent network logic, MSC 18 may signal to the control point at the start and finish of PSTN calls by mobile station 20, and the control point may programmatically report the call state to presence store 80, so that presence store 80 would maintain current state records. Other mechanisms for maintaining PSTN presence data may be possible as well.

FIG. 5B depicts example device capabilities data that may be stored in device capabilities store 82. As shown, the example device capabilities data lists for each of a plurality of mobile stations (identified by MIN for instance) whether the mobile station supports control plane signaling or user plane signaling. Although the simplified data expresses "control" or "user" per device, it could of course take other forms. For example, the data could merely indicate with a Boolean flag whether a device supports user plane signaling, presuming that devices would normally support control plane signaling. Further, although the simplified data is shown as a single table, it (like other data tables described here) could be structured in a more complex form, such as one table that indicates make/model per mobile station MIN and another table that indicates per make/model whether the device is capable of control plane or user plane signaling.

FIG. 5C depicts example subscriber profile data that may be stored in the subscriber profile store 84. As shown, the example subscriber profile data lists for each of a plurality of mobile stations (e.g., subscriber accounts) a user-specified preference (or perhaps a service level mandated preference) for use of control plane signaling versus user plane signaling. In practice, an end-user or system administrator might be given the opportunity to provision this data through a web interface or in some other manner.

FIG. 5D depicts example factor prioritization data that may be stored in the factor prioritization data store 86. In the simple example shown, several factors are listed in a table form, each with a designated priority level. In practice, when positioning system 32 is determining whether to use control plane signaling or user plane signaling, the positioning system 32 may refer to this factor prioritization data to determine which factor to weigh most heavily, or to resolve conflicts between determinations resulting from different factors.

Figure 6:
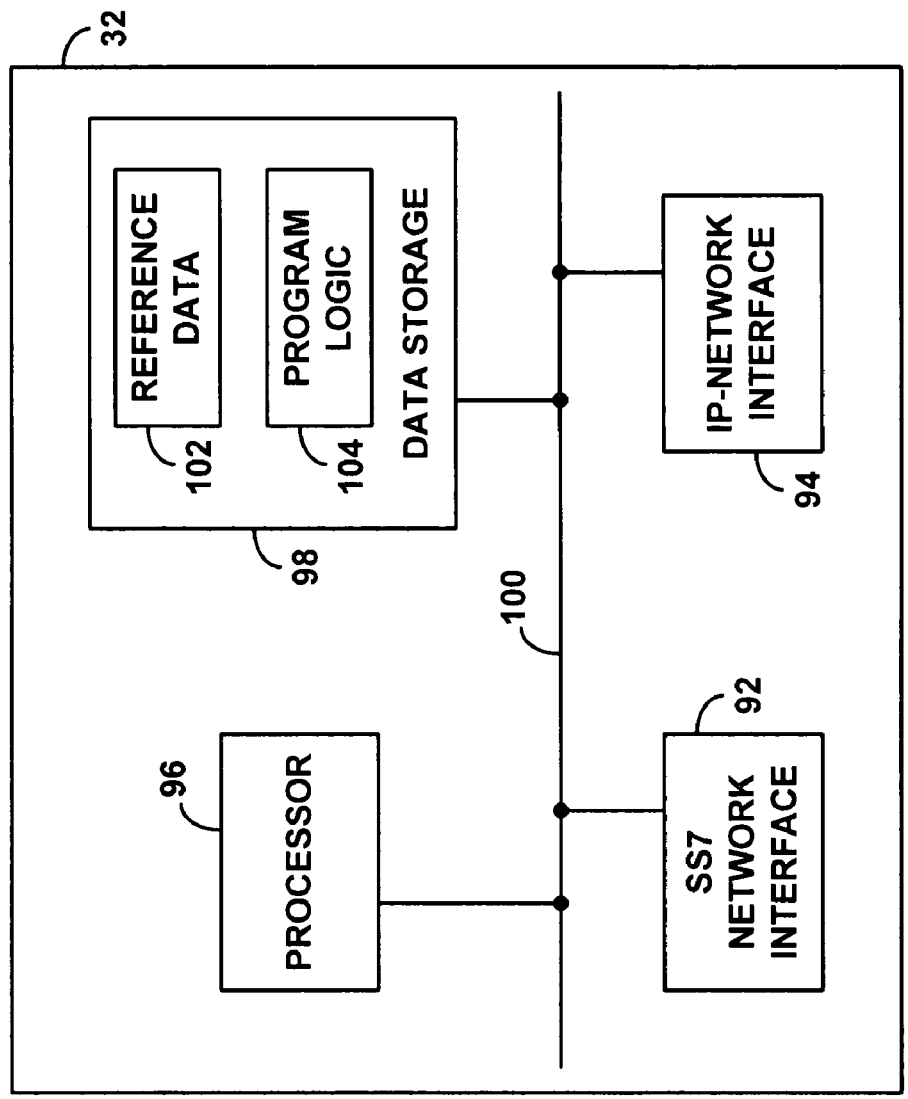
FIG. 6 is a simplified block diagram depicting functional components of an exemplary positioning system.

Referring next to FIG. 6, a simplified block diagram of positioning system 32 illustrates some of the functional components that may be included in such a system. It should be understood that these components could be provided in both an MPC and a PDE or in a combination MPC/PDE, or in any other form. Further, it should be understood that this and other arrangements and processes described throughout this document are set forth for purposes of example only, and that numerous variations are possible, including adding, removing, distributing, consolidating, re-ordering, or otherwise modifying one or more components or functions.

As shown in FIG. 6, the example positioning system 32 includes an SS7 interface 92, a packet-network interface 94, a processor 96, and data storage 98, all of which may be communicatively linked together by a system bus, network, or other mechanism 100. SS7 interface 92 comprises a network interface arranged to facilitate communication on SS7 network 40, so that positioning system 32 can engage in control plane signaling or other interactions via SS7 network 40. Packet-network interface 94 comprises a network interface (such as an Ethernet interface) arranged to facilitate communication on packet-switched network, so that positioning system 32 can engage in user plane signaling. Positioning system 32 may further consult the various data sources noted above (or others) via SS7 network 40 or via packet network 28, preferably via packet network 28.

Processor 96 comprises one or more general purpose processors (e.g., INTEL microprocessors) and/or one or more special purpose processors (e.g., digital signal processors, etc.) Data storage 98, in turn, comprises one or more storage components, such as magnetic, optical, or organic storage mechanisms, and may be integrated in whole or in part with processor 96. Data storage 98 may contain both reference data 102 and program logic 104.

The reference data 102 may comprise replacements for (or copies of) any of the data sources described above or other data sources that processor 96 can reference to facilitate implementation of the invention. For instance, the reference data may comprise the factor prioritization data described above, rather than maintaining that data in a separate data store, so that processor 96 can have more ready access to the data. Reference data 98 may take other forms as well.

The program logic 104, in turn, may comprise machine language instructions or other sorts of program instructions executable by processor 96 to carry out the various functions described herein. For instance, the program logic 104 may define logic executable by processor 96, upon receipt of a location request, to determine based on one or more factors whether to use control plane signaling or user plane signaling to obtain data for determining mobile station location. Program logic 104 may then define logic executable by the processor 96 to engage in the determined type of signaling. In an alternative embodiment, it should be understood that these logical functions can be implemented by firmware and/or hardware, or by any combination of software, firmware, and/or hardware.

An exemplary embodiment of the invention has been described above. Those skilled in the art will understand, however, that changes and modifications may be made to the embodiment described without departing from the true scope and spirit of the invention, which is defined by the claims.

What is claimed is:

1. A method comprising:
   receiving into a positioning system a request for location of a mobile station;
   in response to the request, making a determination, based on one or more factors, of whether to obtain mobile station location data through control plane signaling or user plane signaling;
   if the determination is to obtain the mobile station location data through control plane signaling, then engaging in control plane signaling to obtain the mobile station location data; and
   if the determination is to obtain the mobile station location data through user plane signaling, then engaging in user plane signaling to obtain the mobile station location data,
   wherein the one or more factors comprises mobile station capability, and
   wherein making the determination based on the one or more factors comprises (i) consulting a device capabilities store to determine whether a mobile station at issue supports user plane signaling, (ii) if the mobile station supports user plane signaling then making the determination to employ user plane signaling, and (iii) if the mobile station does not support user plane signaling then making the determination to employ control plane signaling.

2. The method of claim 1, further comprising carrying out the method at least two times, wherein the determination a first of the times is to obtain the mobile station location data through control plane signaling, and wherein the determination a second of the times is to obtain the mobile station location data through user plane signaling.

3. A method comprising:
   receiving into a positioning system a request for location of a mobile station;
   in response to the request, making a determination, based on one or more factors, of whether to obtain mobile station location data through control plane signaling or user plane signaling;
   if the determination is to obtain the mobile station location data through control plane signaling, then engaging in control plane signaling to obtain the mobile station location data; and if the determination is to obtain the mobile station location data through user plane signaling, then engaging in user plane signaling to obtain the mobile station location data, wherein the one or more factors comprises mobile station call state, wherein making the determination based on the one or more factors comprises (i) consulting a presence store to determine whether a mobile station at issue is currently engaged in a call, and (ii) basing the determination based on whether the mobile station is currently engaged in a call, and wherein making the determination based on whether the mobile station is currently engaged in a call comprises: (a) if the mobile station is currently engaged in a call, making the determination to employ control plane signaling and (b) if the mobile station is not currently engaged in call, making the determination to employ user plane signaling.

4. The method of claim 3, further basing the determination on whether the mobile station supports simultaneous voice and data communication.

5. The method of claim 3, further comprising carrying out the method at least two times, wherein the determination a first of the times is to obtain the mobile station location data through control plane signaling, and wherein the determination a second of the times is to obtain the mobile station location data through user plane signaling.

6. A method comprising:

receiving into a positioning system a request for location of a mobile station;

in response to the request, making a determination, based on one or more factors, of whether to obtain mobile station location data through control plane signaling or user plane signaling;

if the determination is to obtain the mobile station location data through control plane signaling, then engaging in control plane signaling to obtain the mobile station location data; and if the determination is to obtain the mobile station location data through user plane signaling, then engaging in user plane signaling to obtain the mobile station location data, wherein the request for location defines a level of precision, and wherein the one or more factors comprises the level of precision, and wherein making the determination based on the one or more factors comprises (i) if the level of precision is a first level, making the determination to employ control plane signaling; and (ii) if the level of precision is a second level, making the determination to employ user plane signaling, wherein the second level is greater than the first level.

7. The method of claim 6, further comprising carrying out the method at least two times, wherein the determination a first of the times is to obtain the mobile station location data through control plane signaling, and wherein the determination a second of the times is to obtain the mobile station location data through user plane signaling.

8. A method comprising:

receiving into a positioning system a request for location of a mobile station;

in response to the request, making a determination, based on one or more factors, of whether to obtain mobile station location data through control plane signaling or user plane signaling;

if the determination is to obtain the mobile station location data through control plane signaling, then engaging in control plane signaling to obtain the mobile station location data; and if the determination is to obtain the mobile station location data through user plane signaling, then engaging in user plane signaling to obtain the mobile station location data, wherein the control plane signaling comprises a first communication session between the positioning system and a switch serving a mobile station at issue, and a second communication between the switch and the mobile station, and wherein the user plane signaling comprises a third communication session between the positioning system and the mobile station.

9. The method of claim 8, wherein the first communication session comprises an IS-881 communication session;

wherein the second communication session comprises an IS-801 session; and wherein the third communication session comprises at least one of an SMS session and an IS-801 over IP session.

10. The method of claim 8, further comprising carrying out the method at least two times, wherein the determination a first of the times is to obtain the mobile station location data through control plane signaling, and wherein the determination a second of the times is to obtain the mobile station location data through user plane signaling.

11. The method of claim 8, wherein the one or more factors comprises a preference indicated by the received request for location.

12. The method of claim 11, wherein receiving the request for location comprises receiving the request for location over a network from a location based service application, and wherein the location based service application includes the preference indication in the request for location.

13. The method of claim 8, wherein the one or more factors comprises failure of control plane or user plane signaling.

14. The method of claim 13, wherein making the determination based on the one or more factors comprises:

attempting to employ user plane signaling; and determining that the user plane signaling has failed, and responsively employing control plane signaling.

15. The method of claim 14, wherein determining that the user plane signaling has failed comprises detecting expiration of a lifetime timer after sending a user plane signaling message to the mobile station, without receiving a response from the mobile station.

16. The method of claim 13, wherein making the determination based on the one or more factors comprises:

attempting to employ control plane signaling; and determining that the control plane signaling has failed, and responsively employing user plane signaling.

17. The method of claim 8, wherein the one or more factors comprises two or more of the following:

mobile station capability;

mobile station call state;

mobile station support for user plane signaling;

mobile station support for simultaneous voice and data communication;

time;

precision of requested location;

subscriber preference;

failure of control plane or user plane signaling; and preference specified by the request.

18. The method of claim 17, wherein
taking into account a plurality of the factors when making the determination;
applying factor prioritization data to weigh or resolve conflicts among the plurality of factors.

19. A positioning system arranged to selectively apply user plane signaling or control plane signaling on a case by case basis, the positioning system comprising:
- a first signaling interface for communicating on a first network to engage in control plane signaling;
- a second signaling interface for communicating on second network to engage in user plane signaling;
- a processor; and
- data storage containing program logic executable by the processor upon receipt of a request for location of a mobile station, (i) to make a determination, based on one or more factors, of whether to obtain mobile station location data through control plane signaling or user plane signaling, (ii) if the determination is to obtain the mobile station location data through control plane signaling, then engaging in control plane signaling via the first network interface to obtain the mobile station location data, and (iii) if the determination is to obtain the mobile station location data through user plane signaling, then engaging in user plane signaling via the second network interface to obtain the mobile station location data,
- wherein the control plane signaling comprises a first communication session between the positioning system and a switch serving a mobile station at issue, and a second communication between the switch and the mobile station; and
- wherein the user plane signaling comprises a third communication session between the positioning system and the mobile station.

20. The positioning system of claim 19,
wherein the first communication session comprises an IS-881 communication session;
wherein the second communication session comprises an IS-801 session; and
wherein the third communication session comprises at least one of an SMS session and an IS-801 over IP session.

* * * * *